US011967456B1

(12) United States Patent
Liu et al.

(10) Patent No.: US 11,967,456 B1
(45) Date of Patent: Apr. 23, 2024

(54) DEVICE AND METHOD FOR PREPARING THERMOSETTING BONDED MAGNET

(71) Applicant: Peking University, Beijing (CN)

(72) Inventors: Shunquan Liu, Beijing (CN); Jinbo Yang, Beijing (CN); Jingzhi Han, Beijing (CN); Qing Xu, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 18/449,665

(22) Filed: Aug. 14, 2023

(30) Foreign Application Priority Data

Sep. 30, 2022 (CN) ......................... 202211214670.4

(51) Int. Cl.
*H01F 41/02* (2006.01)

(52) U.S. Cl.
CPC ................................ *H01F 41/0266* (2013.01)

(58) Field of Classification Search
None
See application file for complete search history.

(56) References Cited

U.S. PATENT DOCUMENTS

2018/0309351 A1* 10/2018 Tachi .................. H01F 41/0266

FOREIGN PATENT DOCUMENTS

DE 102021106222 A1 * 9/2022

OTHER PUBLICATIONS

Machine translation of DE 102021106222. Sep. 15. (Year: 2022).*

* cited by examiner

*Primary Examiner* — Xiaowei Su

(57) ABSTRACT

A device and method for preparing a thermosetting bonded magnet are provided, the device includes a compressed air glue feeding tank and a composite-function mold. A feeding end of the compressed air glue feeding tank is connected to the composite-function mold. The composite-function mold includes a housing, the housing is disposed at an upper end and a lower end of the composite-function mold, and the housing includes a polytetrafluoroethylene upper cover and a polytetrafluoroethylene lower cover; the polytetrafluoroethylene upper cover and the polytetrafluoroethylene lower cover are respectively disposed at the upper end and the lower end of composite-function mold. The method uses a silica gel material as a binder for anisotropic magnets, and the selected raw materials and process are suitable for quickly obtaining a uniform magnet slurry. The curing process is controllable, and there is no organic solvent or heating during the mixing process.

7 Claims, 5 Drawing Sheets

DEVICE AND METHOD FOR PREPARING THERMOSETTING BONDED MAGNET

TECHNICAL FIELD

The disclosure relates to the field of production of thermosetting bonded magnets, and particularly to a device and method for preparing a thermosetting bonded magnet.

BACKGROUND

Bonded rare earth permanent magnets can be divided into two categories: isotropic bonded magnets and anisotropic bonded magnets. Specifically, the anisotropic bonded magnets can provide excellent magnetic properties by applying an alignment magnetic field in a preparation process, and thus the anisotropic bonded magnets have attracted more and more attention in the field of excellent magnetic devices. In the fields of home appliances, automobiles, office, medical and factory automation, the anisotropic bonded magnets are used to manufacture various micro-motors, magnetic devices, and magnetic medical devices.

The anisotropic bonded magnets are mainly divided into thermosetting magnets and thermoplastic magnets based on a binder used in the preparation process. However, in a preparation process of the thermosetting magnets, the corresponding binder needs to be cured under a constant magnetic field and temperature firstly, then the corresponding binder needs to undergo a secondary curing process, and thus a traditional preparation process of the thermosetting magnets will greatly reduce a yield of the thermosetting magnets. Moreover, the traditional preparation process of the thermosetting magnets only produces a type of bonded magnet which is in a rigid state after curing, so that the type of the bonded magnet cannot be processed into a flexible magnet similar to a thermoplastic magnet, thereby greatly limiting the manufacturing and application schemes of the thermosetting magnets.

In addition, in a preparation process of the thermoplastic magnets, a thermoplastic binder is used to prepare thermoplastic flexible magnets mainly based on rolling. The preparation process involves steps including complex auxiliary configuration, inert powder mixing, formula coating, low-temperature mixing of materials, solvent evaporation, screw mixing or warm kneading, warm rolling, extrusion, and so on. Meanwhile, a solution for providing an alignment magnetic field to achieve magnetic alignment during the rolling or extrusion is very complex and difficult. The preparation process has low production efficiency and high costs, which prevents the widespread use of the anisotropic bonded magnets.

In view of the above, therefore, the disclosure provides a device and method for preparing a thermosetting bonded magnet to solve the above problems.

SUMMARY

In order to solve the above problems, the disclosure provides a method and device for preparing a thermosetting bonded magnet to solve the problems as follows: in a preparation process of the thermosetting magnets, the binder needs to be cured under stable temperature and pressure, then the binder needs to undergo a secondary curing process, and thus a traditional preparation process of the thermosetting magnets will greatly reduce a yield of the thermosetting magnets. Moreover, the traditional preparation process of the thermosetting magnets only produces a type of bonded magnet which is in a rigid state after curing, so that the type of the bonded magnet cannot be processed into a flexible magnet similar to a thermoplastic magnet, thereby greatly limiting the manufacturing and application schemes of the thermosetting magnets.

The device for preparing the thermosetting bonded magnet includes a compressed air glue feeding tank and a composite-function mold. A feeding end of the compressed air glue feeding tank is connected to the composite-function mold.

the composite-function mold includes a housing, the housing is disposed at an upper end and a lower end of the composite-function mold, and the housing includes a polytetrafluoroethylene upper cover and a polytetrafluoroethylene lower cover; the polytetrafluoroethylene upper cover and the polytetrafluoroethylene lower cover are respectively disposed at the upper end and the lower end of composite-function mold; a notched internal wall of the polytetrafluoroethylene upper cover and a notched internal wall of the polytetrafluoroethylene lower cover are respectively connected to magnetic iron cores, the polyfluortetraethylene upper cover and the polyfluortetraethylene lower cover together define a cavity therebetween; a rubber ring is disposed between a surface of a corresponding one of the magnetic iron cores and the notched internal wall of the polyfluortetraethylene upper cover; a kneading assembly is disposed in the composite-function mold; and a permanent magnet orientation pole head frame mechanism is disposed on a surface of the composite-function mold.

In an embodiment, the polytetrafluoroethylene upper cover and the polytetrafluoroethylene lower cover are symmetrically distributed along a transverse central axis of the composite-function mold; and the magnetic iron core connected to the notched internal wall of the polytetrafluoroethylene lower wall and the polytetrafluoroethylene lower cover are sealed through a rubber ring when the polytetrafluoroethylene upper cover and the polytetrafluoroethylene lower cover are closed, thereby making a slurry area be in a closed state.

In an embodiment, the kneading assembly comprises a vacuum air hole, a feeding hole, a detachment air hole, film heating plates, temperature controllers, and micro rechargeable batteries; the feeding hole is provided at an end of the composite-function mold connected to the compressed air glue feeding tank; and the vacuum air hole and the detachment air hole are provided sequentially from top to bottom at another end of the composite-function mold, and the vacuum air hole is configured for connecting to a vacuum pump.

In an embodiment, film heating plates are disposed between notched internal walls of the housing and the magnetic iron cores, temperature controllers and micro rechargeable batteries are embedded in the housing; and the film heating plate, the temperature controllers, and the micro rechargeable batteries are electrically connected with each other, and a fixing assembly is disposed in the housing.

In an embodiment, the fixing assembly comprises first screws, second screws, and third screws; each of the first screws is configured to pass through the housing and a corresponding one of the film heating plates to fix the housing, the corresponding one of the film heating plates, and a corresponding one of the magnetic cores; each of the second screws is configured to pass through a temperature control switch on a surface of a corresponding one of the temperature controllers to fix the temperature control switch and a corresponding one of the magnetic cores; and each of the third screws is configured to pass through a thermometer on the surface of the corresponding one of the temperature controllers to fix the thermometer and the housing.

In an embodiment, the permanent magnet orientation pole head frame mechanism comprises left and right brackets, and left and right orientation pole heads; and the left orientation pole head and the right orientation pole head repel each other magnetically.

In an embodiment, a distance adjusting turntable is screwed between opposite ends of the left and right brackets, rare earth permanent magnets with different polarities are respectively disposed on a disc surface of the left orientation pole head and a disc surface of the right orientation pole head, one of the left and right orientation pole heads is an active pole head, a side of the active pole head is provided with a motor, and the other one of the left and right orientation pole heads is a passive pole head.

A method for preparing a thermosetting bonded magnet is provided, and the method includes followings steps S1-S8.

S1, selecting raw materials: selecting powders and a silica gel binder as the raw materials, the powders including a hydrogenation-disproportionation-desorption-recombination (HDDR) neodymium-iron-boron magnetic powder, a samarium-iron-nitrogen magnetic powder, and a graphene powder, and the silica gel binder comprising a first silica gel, a second silica gel, and a curing agent; weighting the HDDR neodymium-iron-boron magnetic powder, the samarium-iron-nitrogen magnetic powder, and the graphene powder in a loose volume ratio of 4:1:0.3 to obtain weighted powders for standby, and determining a mass of the silica gel binder according to a mass ratio of 89:11 between a total mass of the powders and the mass of the silica gel binder.

S2, mixing: mixing the first silica gel, the second silica gel, and the curing agent to obtain the silica gel binder, putting the silica gel binder and the weighted powders into a planetary vacuum deaeration mixer for mixing in a non-contact manner for 5 minutes to obtain a black slurry.

S3, grinding: putting the black slurry into an open-type three roll grinding machine and repeatedly grinding the black slurry for 5 minutes.

S4, storing: collecting the black slurry after the grinding as a magnet slurry, storing the magnet slurry in a compressed air glue feeding tank for standy.

S5, feeding: feeding: ensuring that a cavity of the composite-function mold is clean and free of impurities before preparing the thermosetting bonded magnet, closing a housing provided with magnetic iron cores, opening a vacuum valve and using a vacuum pump system to slowly evacuate gases in the cavity to make a gas pressure inside the cavity be equal to or lower than 1 pascal, connecting a feeding end of the compressed air glue feeding tank to a feeding hole, controlling a feeding valve to open to allow the magnet slurry to be gradually sucked into the cavity under a pressure difference between an inside of the cavity and an outside of the cavity, closing the vacuum valve after a volume of the magnet slurry in the cavity reaches a preset volume, removing the vacuum pump system when the magnet slurry no longer enters the cavity, closing the feeding valve, and removing the compressed air glue feeding tank.

S6, kneading: heating the composite-function mold slowly to a preset temperature after finishing the feeding, putting the composite-function mold between upper and lower trays of left and right brackets for clamping the composite-function mold, adjusting a distance adjusting turntable between left and right orientation pole heads for clamping the composite-function mold, removing the upper and lower trays after the composite-function mold is clamped by the left and right orientation pole heads, and turning on a motor at a side of an active pole head of the left and right orientation pole heads to drive a passive pole head of the left and right orientation pole heads and the composite-function mold to rotate simultaneously.

S7, standing: stopping rotating of the passive pole head of the left and right orientation pole heads after the kneading is performed for a preset period, maintaining a constant magnetic field and a constant temperature of the composite-function mold until timing for maintaining both of the constant magnetic field and the constant temperature is over, removing the constant magnetic field, taking out the composite-function mold between the left and right brackets and maintaining the constant temperature, cooling down the composite-function mold after timing for maintaining the constant temperature is over, opening a valve to inject compressed air to a detachment air hole to make housing automatically open under a pressure and thus to make the thermosetting bonded magnet detach from the composite-function mold (2).

S8, testing magnetic strength: testing a magnetic strength of the thermosetting bonded magnet with a magnetometer.

In an embodiment, the black slurry obtained in S2 is a uniformly black viscous slurry without bubbles, In an embodiment, in S6, during rotating of the composite-function mold (2) and the passive pole head of the left and right orientation pole heads (19), the constant magnetic field and the constant temperature are maintained.

Compared with related art, the disclosure has following beneficial effects.

1. The disclosure a silica gel material as a binder for anisotropic magnets, and the selected raw materials and process are suitable for quickly obtaining a uniform magnet slurry by one-step method. The curing process is highly controllable, and there is no organic solvent or heating during the overall mixing process, which is safe and non-toxic. In addition, the overall process is also suitable for the preparation of other hard bonded magnets using thermosetting materials as a binder.

2. That permanent magnet are arranged through a design of a magnetic circuit to provide an alignment magnetic field, a magnetic material with a large size can be oriented, and a complex structure including an electromagnet and a coil is not needed in the magnetic alignment process.

3. The disclosure greatly simplifies a structure of a device for preparing anisotropic bonded magnets and significantly reduces device costs by integrating a portable composite-function mold with heating function. A modular feeding process can be realized, the composite-function mold can be separately filled with materials, the materials in the composite-function mold can also be separately heated and cured without leaving the mold, and long-term heating and curing do not occupy subsequent process workstations.

DESCRIPTION OF REFERENCE NUMERALS

Figure 1:
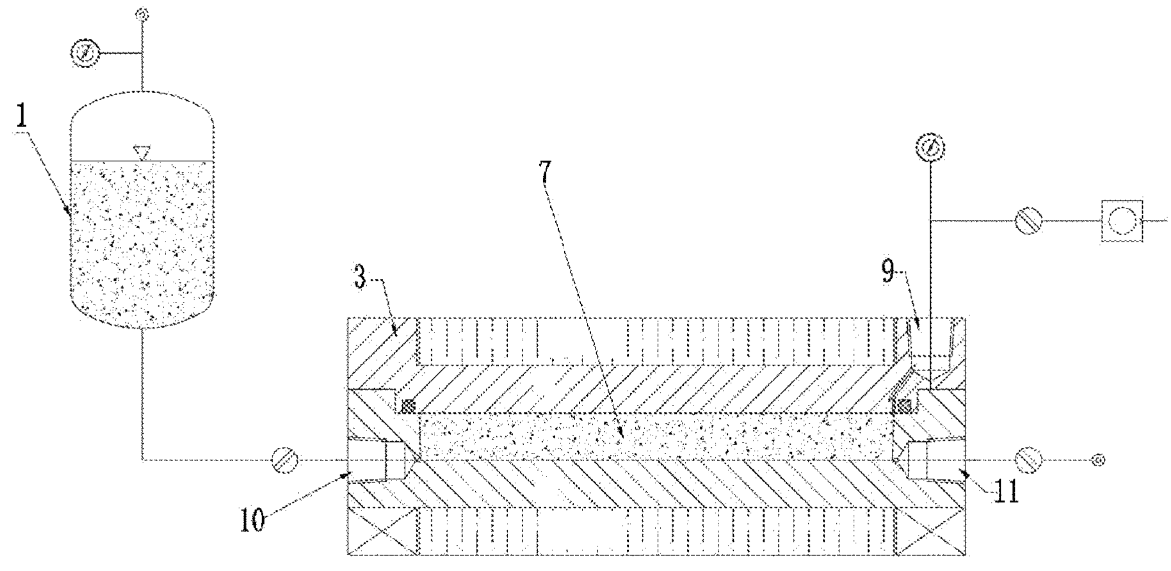
FIG. 1 is a schematic front view of a device for preparing a thermosetting bonded magnet of the disclosure.

1—compressed air glue feeding tank; 2—composite-function mold; 3—housing; 4—polytetrafluoroethylene upper cover; 5—polytetrafluoroethylene lower cover; 6—magnetic iron core; 7—cavity; 8—rubber ring; 9—vacuum air hole; 10—feeding hole; 11—detachment air hole; 12—film heating plate; 13—temperature controller; 14—micro rechargeable battery; 15—first screw; 16—second screw; 17—third screw; 18—left and right brackets; 19—left and right orientation pole heads; 20—distance adjusting turntable; 21—rare earth permanent magnet; 22—motor; 23—temperature control switch; 25—vacuum pump.

DETAILED DESCRIPTION OF EMBODIMENTS

The following will provide a further detailed description of the embodiments of the disclosure in conjunction with the drawings and embodiments. The following embodiments are used to interrupt disclosure, but cannot be used to limit the scope of the disclosure.

As shown in FIGS. 1-6, the disclosure provides a device for preparing a thermosetting bonded magnet, the device includes a compressed air glue feeding tank 1 and a composite-function mold 2; a feeding end of the compressed air glue feeding tank 1 is connected to the composite-function mold 2.

The composite-function mold 2 includes a housing 3, the housing 3 is disposed at an upper end and a lower end of the composite-function mold 2, and the housing 3 includes a polytetrafluoroethylene upper cover 4 and a polytetrafluoroethylene lower cover 5; the polytetrafluoroethylene upper cover 4 and the polytetrafluoroethylene lower cover 5 are respectively disposed at the upper end and the lower end of composite-function mold 2, a notched internal wall of the polytetrafluoroethylene upper cover 4 and a notched internal wall of the polytetrafluoroethylene lower cover 5 are respectively connected to magnetic iron cores 6, the polyfluortetraethylene upper cover 4 and the polyfluortetraethylene lower cover 5 together define a cavity 7, a rubber ring 8 is disposed between a surface of a corresponding one of the magnetic iron cores 6 and the notched internal wall of the polyfluortetraethylene upper cover 4, a kneading assembly is disposed in the composite-function mold 2, and a permanent magnet orientation pole head frame mechanism is disposed on a surface of the composite-function mold 2.

Figure 2:
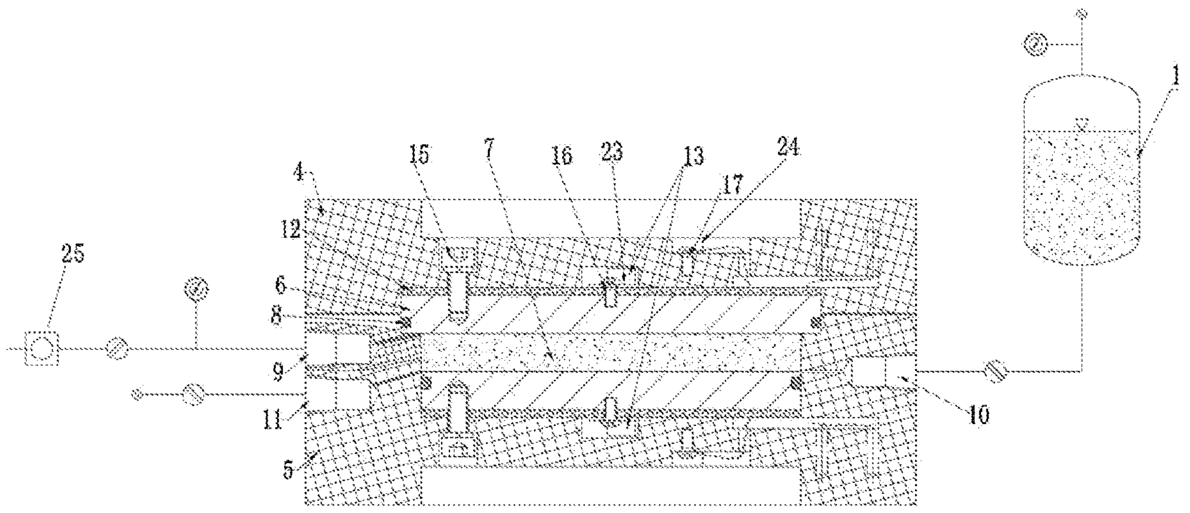
FIG. 2 is a schematic cross-sectional view of a composite-function mold of the disclosure.
Figure 3:
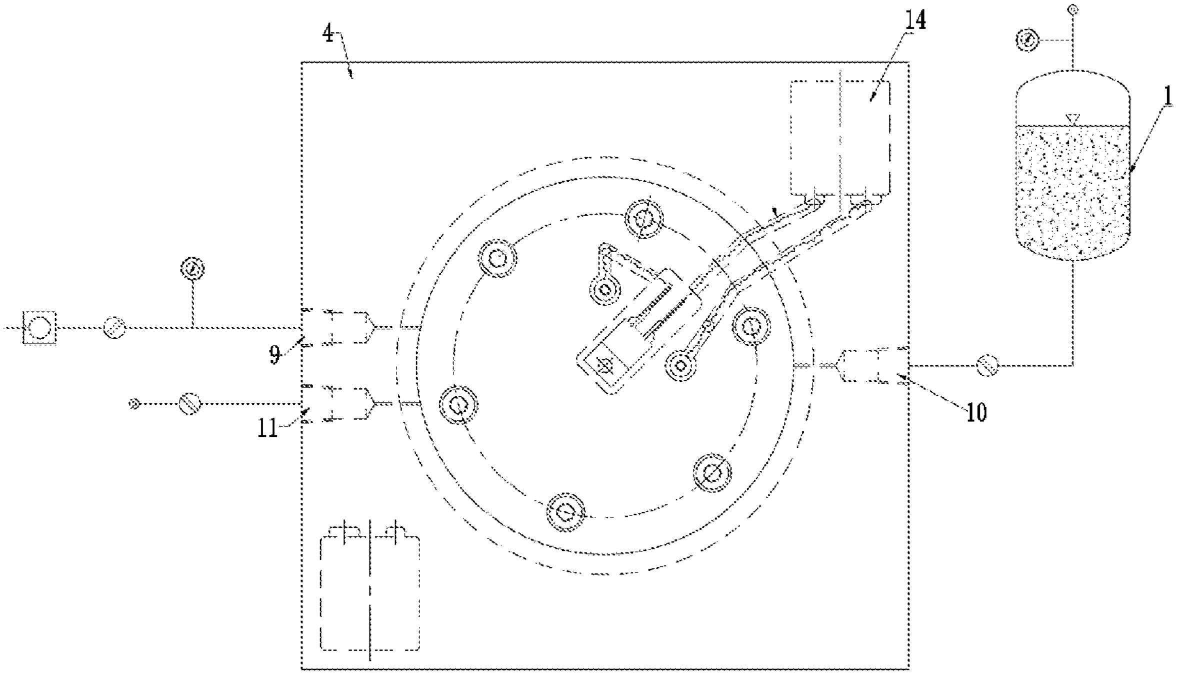
FIG. 3 is a schematic top view of a composite-function mold of the disclosure.
Figure 4:
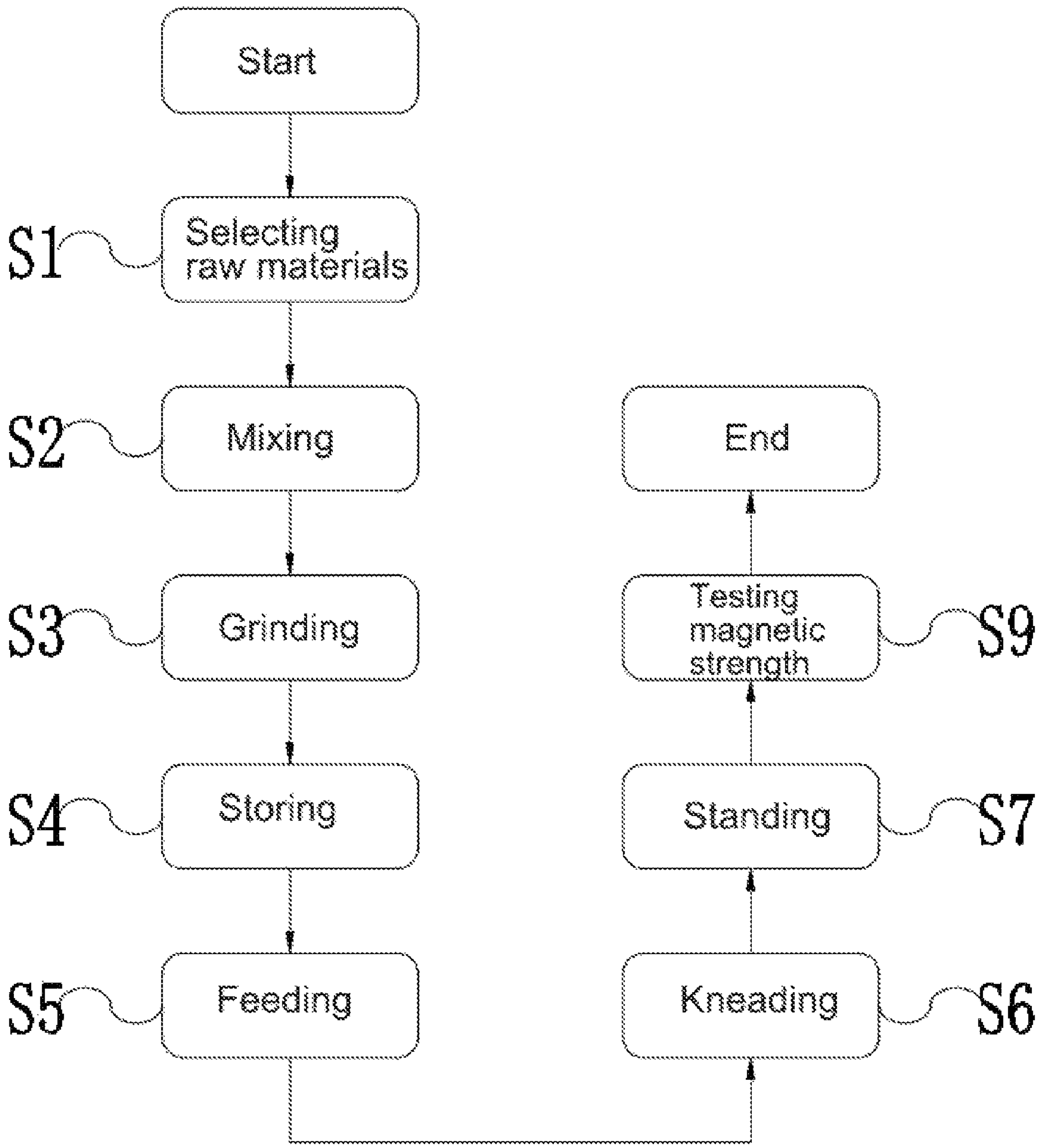
FIG. 4 is a schematic flowchart of a method for preparing the thermosetting bonded magnet of the disclosure.

Please refer to FIG. 2, the polytetrafluoroethylene upper cover 4 and the polytetrafluoroethylene lower cover 5 are symmetrically distributed along a transverse central axis of the composite-function mold 2; and the magnetic iron core 6 connected to the notched internal wall of the polytetrafluoroethylene lower wall 5 and the polytetrafluoroethylene lower cover 5 are sealed through a rubber ring 8 when the polytetrafluoroethylene upper cover 4 and the polytetrafluoroethylene lower cover 5 are closed, thereby making a slurry area in the composite-function mold 2 be in a closed state.

Please refer to FIG. 2, the kneading assembly includes a vacuum air hole 9, a feeding hole 10, a detachment air hole 11, film heating plates 12, temperature controllers 13, and micro rechargeable batteries 14; the feeding hole 10 is provided at an end of the composite-function mold 2 connected to the compressed air glue feeding tank 1; and the vacuum air hole 9 and the detachment air hole 11 are provided sequentially from top to bottom at another end of the composite-function mold 2, and the vacuum air hole 9 is configured for connecting to a vacuum pump 25.

Please refer to FIG. 2, the film heating plates 12 are disposed between notched internal walls of the housing 3 and the magnetic iron cores 6, temperature controllers 13 and micro rechargeable batteries 14 are embedded in the housing 3;

the film heating plates 12, the temperature controllers 13, and the micro rechargeable batteries 14 are electrically connected with each other, and a fixing assembly is disposed in the housing 3. In addition, the film heating plates 12 are configured to heat a magnet slurry to form the thermosetting bonded magnet, each of the temperature controllers 13 is configured to control temperature of the film heating plates 12, and the micro rechargeable batteries 14 are configured to provide power for the temperature controllers 13 and the film heating plates 12.

Please refer to FIG. 2, the fixing assembly comprises first screws (15), second screws 16, and third screws 17; each of the first screws 15 is configured to pass through the housing 3 and a corresponding one of the film heating plates 12 to fix the housing 3, the corresponding one of the film heating plates 12, and a corresponding one of the magnetic cores 6; each of the second screws 16 is configured to pass through a temperature control switch 23 on a surface of a corresponding one of the temperature controllers 13 to fix the temperature control switch 23 and a corresponding one of the magnetic cores 6; and each of the third screws 17 is configured to pass through a thermometer 24 on the surface of the corresponding one of the temperature controllers 13 to fix the thermometer 24 and the housing 3.

Figure 5:
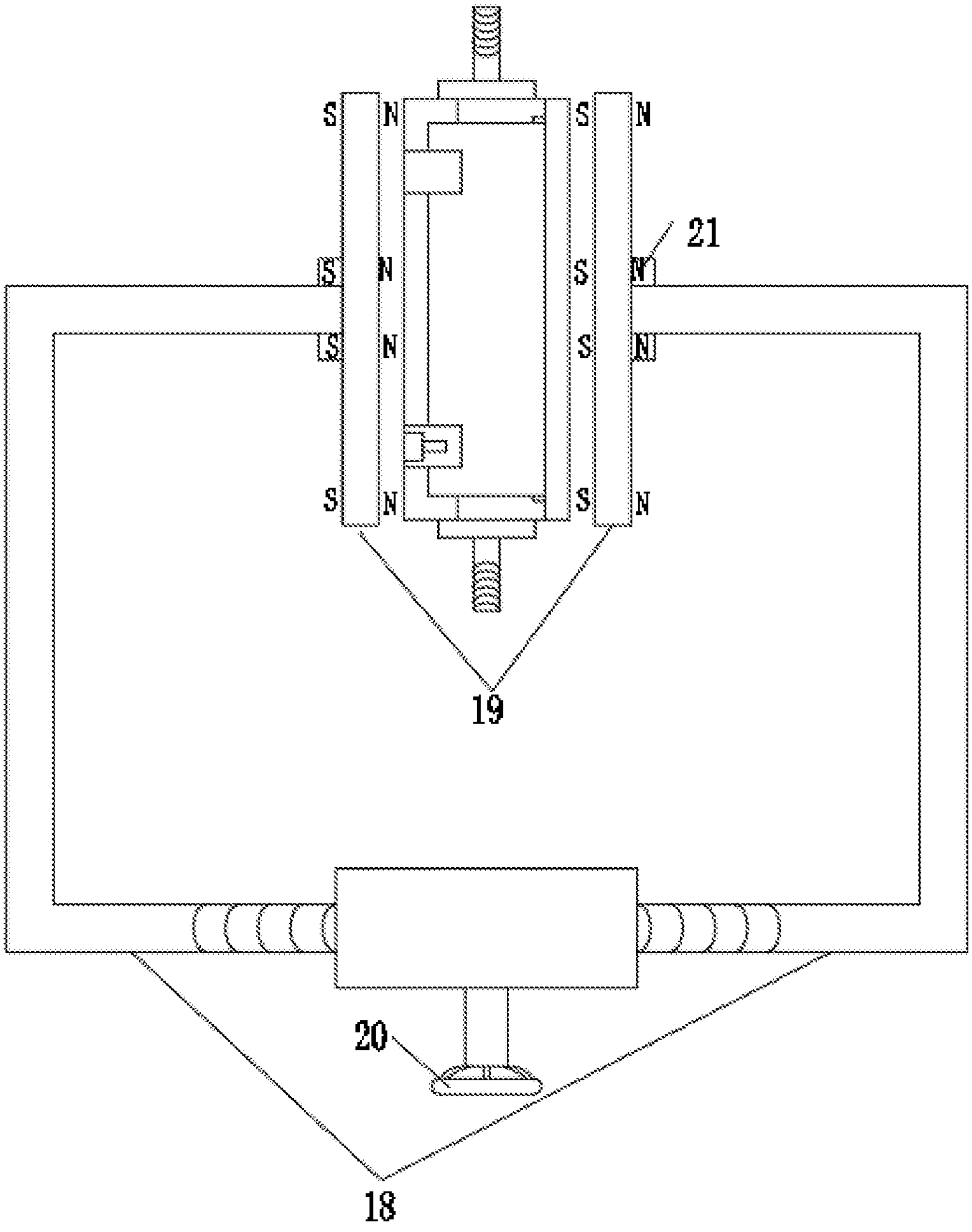
FIG. 5 is a schematic diagram of a left orientation pole head and a right orientation pole head of the disclosure.
Figure 6:
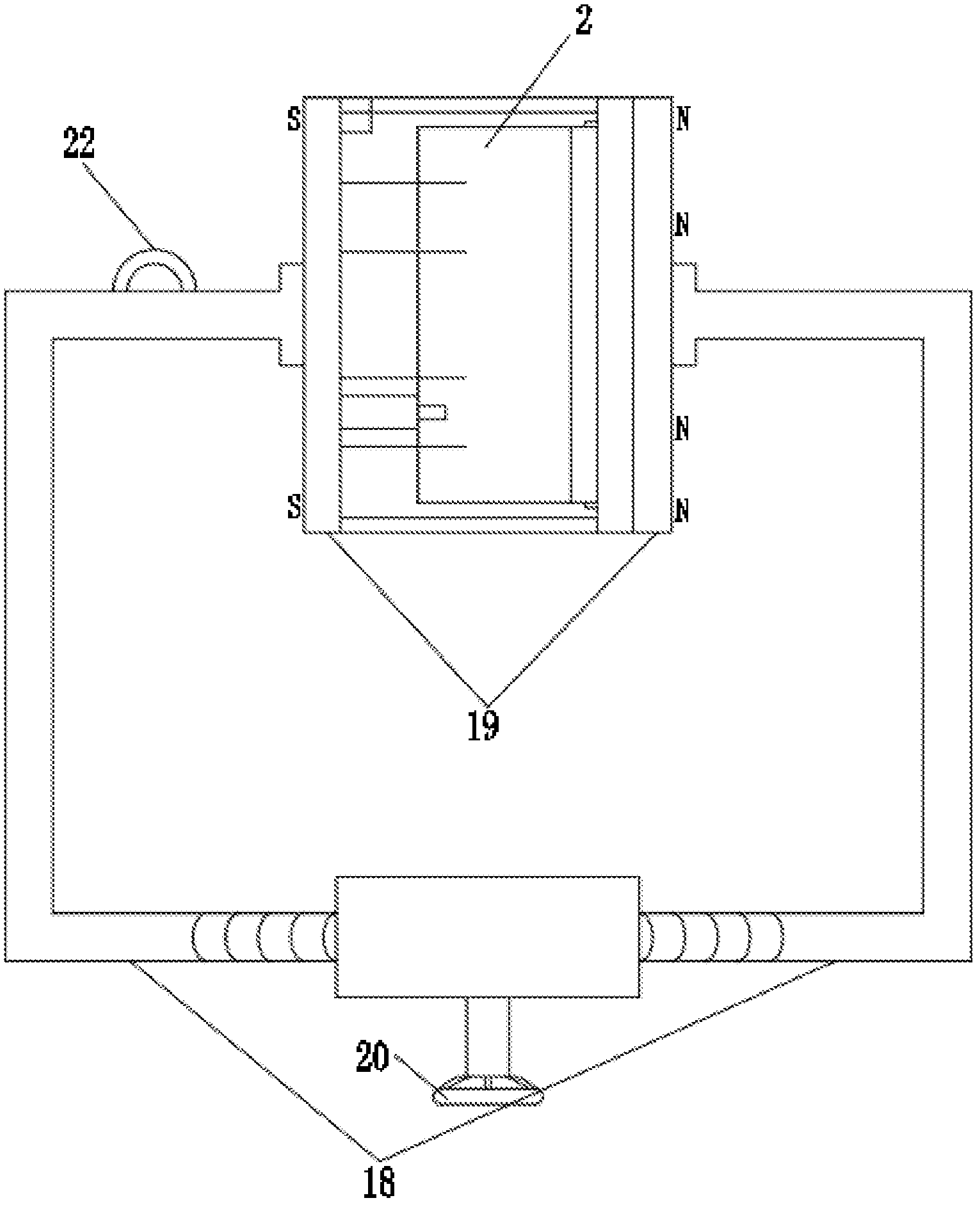
FIG. 6 is a schematic diagram when the composite-function mold is clamped between the left orientation pole head and the right orientation pole head.

Please refer to FIG. 5 and FIG. 6, a distance adjusting turntable 20 is screwed between opposite ends of the left and right brackets 18, rare earth permanent magnets 21 with different polarities are respectively disposed on a disc surface of the left orientation pole head and a disc surface of the right orientation pole head, one of the left and right orientation pole heads 19 is an active pole head, a side of the active pole head is provided with a motor 22, and the other one of the left and right orientation pole heads 19 is a passive pole head.

Embodiment 1

A method for preparing a thermosetting bonded magnet includes following steps S1-88. In the step S1, powders and a silica gel binder are selected as raw materials to prepare a magnet slurry of a thermosetting bonded magnet; the powders include a HDDR neodymium-iron-boron magnetic powder, a samarium-iron-nitrogen magnetic powder, and a graphene powder; and the silica gel binder include a first silica gel, a second silica gel, and a curing agent. 150-mesh HDDR neodymium-iron-boron magnetic powder and the samarium-iron-nitrogen magnetic powder with an average particle size of 2.6 micrometers, and the graphene powder are weighted in a loose volume ratio of 4:1:0.3 to obtain weighted powders for standby; a mass of the silica gel binder is determined according to a mass ratio of 89:11 between a total mass of the powders and the mass of the silica gel binder. In the step S2, A first silica gel, a second silica gel, and a curing agent are mixed to obtain the silica gel binder, the silica gel binder and the weighted powders are put into a planetary vacuum deaeration mixer for mixing in a non-contact manner for 5 minutes to obtain a uniformly black viscous slurry without bubbles (i.e., the magnet slurry), then the magnet slurry is performed with the steps S3-S6 including grinding, storing, feeding, and kneading. Specifically, the preset temperature in the kneading of step S6 is 130° C., both rotation speeds of the composite-function mold 2 and the passive pole head are 20 revolutions per minute (rpm), and the composite-function mold 2 and the passive pole head rotate for about 40 minutes, then the motor 22 is turned off, a constant magnetic field and a constant temperature of the composite-function mold 2 are maintained for 1 hour, and the composite-function mold 2 is taken out between the left and right brackets 18 to continue maintaining the constant temperature for 1 hour. Then the composite-function mold 2 is performed with standing of step S7, thereby obtaining a flexible magnetic sheet with a diameter of 50 mm and a thickness of 12 mm. The magnetic strength of the magnetic sheet (i.e., the thermosetting bonded magnet) tested by a magnetometer is 2150 gauss.

Embodiment 2

A method for preparing a thermosetting bonded magnet includes following step S1-S8. In the step S1, powders and a silica gel binder are selected as raw materials to prepare magnet slurry of a thermosetting bonded magnet; the powders include a neodymium-iron-boron magnetic powder, a samarium-iron-nitrogen magnetic powder, and a molybdenum disulfide powder; and the silica gel binder include a first silica gel, a second silica gel, and a curing agent. 200-mesh HDDR neodymium-iron-boron magnetic powder and the samarium-iron-nitrogen magnetic powder with an average particle size of 2.6 micrometers, and the molybdenum disulfide powder are weighted in a loose volume ratio of 3:1:0.5 to obtain weighted powders for standby; a mass of the silica gel binder is determined according to a mass ratio of 85:15 between a total mass of the powders and the mass of the silica gel binder. In the Step S2, a first silica gel, a second silica gel, and a curing agent are mixed to obtain the silica gel binder, the silica gel binder and the weighted powders are put into a planetary vacuum deaeration mixer for mixing in a non-contact manner for 5 minutes to obtain a uniformly black viscous slurry without bubbles (i.e., the magnet slurry). Then the magnet slurry is performed with steps S3-S6 including grinding, storing, feeding, and kneading. Specifically, the preset temperature in the kneading of step S6 is 110° C., both rotation speeds of the composite-function mold 2 and the passive pole head are 30 rpm, and the composite-function mold 2 and the passive pole head rotate for about 40 minutes, then the motor 22 is turned off, a constant magnetic field and a constant temperature of the composite-function mold 2 are maintained for 2 hour, and the composite-function mold 2 is taken out between the left and right brackets 18 to continue maintaining the constant temperature for 1 hour. Then the composite-function mold 2 is performed with standing of step S7, thereby obtaining a flexible magnetic column with a diameter of 20 mm and a thickness of 15 mm. In the testing of step S8, the magnetic strength of the magnetic column tested by a magnetometer is 1028 gauss Specifically, please refer to FIGS. 1-6, the specific steps S1-S8 of the embodiment 1 are as follows. Step S1, selecting raw materials: selecting powders and a silica gel binder as the raw materials; the powders including a HDDR neodymium-iron-boron magnetic powder (i.e., neodymium-iron-boron magnetic powder prepared by HDDR process), a samarium-iron-nitrogen magnetic powder, and a graphene powder; the silica gel binder including a first silica gel, a second silica gel, and a curing agent; weighting the HDDR neodymium-iron-boron magnetic powder, the samarium-iron-nitrogen magnetic powder, and the graphene powder in a loose volume ratio of 4:1:0.3 to obtain weighted powders for standby, determining a mass of the silica gel binder according to a mass ratio of 89:11 between total mass of the powders and the mass of the silica gel binder. Step S2, mixing: mixing the first silica gel, the second silica gel, and the curing agent to obtain the silica gel binder, putting the silica gel binder and the weighted powders into a planetary vacuum deaeration mixer for mixing in a non-contact manner for 5 minutes to obtain a black slurry (also referred to as the magnet slurry). Step S3, grinding: putting the black slurry into an open-type three roll grinding machine and repeatedly grinding and rolling the black slurry for 5 minutes. Step S4, storing: collecting the black slurry after the grinding as a magnet slurry, storing the magnet slurry in a compressed air glue feeding tank 1 for standy. Step S5, feeding: ensuring that a cavity 7 of the composite-function mold 2 is clean and free of impurities before preparing the thermosetting bonded magnet, closing the housing 3 provided with magnetic iron cores 6, opening a vacuum valve and using a vacuum pump system to slowly evacuate gases in the cavity 7 to make a gas pressure inside the cavity 7 be equal to or lower than 1 pascal, connecting a feeding end of the compressed air glue feeding tank 1 to a feeding hole 10, controlling a feeding valve to open to allow the magnet slurry to be gradually sucked into the cavity 7 under a pressure difference between an inside of the cavity 7 and an outside of the cavity 7, closing the vacuum valve after a volume of the magnet slurry reaches a preset volume, removing the vacuum pump system when the magnet slurry no longer enters the cavity 7, closing the feeding valve, and removing the compressed air glue feeding tank 1. Step S6, kneading: using the film heating plates 12 to heat the composite-function mold 2 slowly to a preset temperature after the magnet slurry enters the cavity 7, putting the composite-function mold 2 between upper and lower trays of left and right brackets 18 for clamping the composite-function mold 2, adjusting a distance adjusting turntable 20 between left and right orientation pole heads 19 for clamping the composite-function mold 2, removing the upper and lower trays after the composite-function mold 2 is clamped by the left and right orientation pole heads 19, and turning on a motor 22 at a side of an active pole head of the left and right orientation pole heads 19 to drive a passive pole head of the left and right orientation pole heads 19 and the composite-function mold 2 to rotate simultaneously in a low speed. S7, standing: stopping rotating of the passive pole head of the left and right orientation pole heads 19 after the kneading is performed for a preset period, maintaining a constant magnetic field and a constant temperature of the composite-function mold 2 until timing for maintaining both of the constant magnetic field and the constant temperature is over, removing the constant magnetic field, taking out the composite-function mold 2 between the left and right brackets 18 and maintaining the constant temperature, cooling down the composite-function mold 2 after timing for maintaining the constant temperature is over, opening a valve to inject compressed air to a detachment air hole 11 to make the housing 3 automatically open under a pressure and thus to make the thermosetting bonded magnet detach from the composite-function mold 2. Step S8, testing magnetic strength: testing magnetic strength of the thermosetting bonded magnet with a magnetometer.

The embodiments of the disclosure are provided to facilitate describing the disclosure. Although embodiments of the disclosure have been shown and described above, it can be understood that the above embodiments are exemplary and cannot be understood as a limitation of the disclosure. Ordinary those skilled in the art can make changes, modifications, substitutions, and modifications to the above embodiments within the scope of the disclosure.

What is claimed is:

1. A device for preparing a thermosetting bonded magnet, comprising a feeding tank (1) and a composite-function mold (2); wherein a feeding end of the feeding tank (1) is connected to the composite-function mold (2); and wherein the composite-function mold (2) comprises a housing (3), the housing (3) is disposed at an upper end and a lower end of the composite-function mold (2), and the housing (3) comprises a polytetrafluoroethylene upper cover (4) and a polytetrafluoroethylene lower cover (5); the polytetrafluoroethylene upper cover (4) and the polytetrafluoroethylene lower cover (5) are respectively disposed at the upper end and the lower end of composite-function mold (2); a notched internal wall of the polytetrafluoroethylene upper cover (4) and a notched internal wall of the polytetrafluoroethylene lower cover (5) are respectively connected to magnetic iron cores (6), the polytetrafluoroethylene upper cover (4) and the polytetrafluoroethylene lower cover (5) together define a cavity (7) therebetween; a rubber ring (8) is disposed between a surface of a corresponding one of the magnetic iron cores (6) and the notched internal wall of the polytetrafluoroethylene upper cover (4); a kneading assembly is disposed in the composite-function mold (2); and a permanent magnet orientation pole head frame mechanism is disposed on a surface of the composite-function mold (2).

2. The device for preparing thermosetting bonded magnet as claimed in claim 1, wherein the polytetrafluoroethylene upper cover (4) and the polytetrafluoroethylene lower cover (5) are symmetrically distributed along a transverse central axis of the composite-function mold (2); and the magnetic iron core (6) connected to the notched internal wall of the polytetrafluoroethylene lower cover (5) and the polytetrafluoroethylene lower cover (5) are sealed through a rubber ring (8) when the polytetrafluoroethylene upper cover (4) and the polytetrafluoroethylene lower cover (5) are closed, thereby making a slurry area be in a closed state.

3. The device for preparing thermosetting bonded magnet as claimed in claim 1, wherein the kneading assembly comprises a first air hole (9), a feeding hole (10), a second air hole (11), film heating plates (12), temperature controllers (13), and rechargeable batteries (14); the feeding hole (10) is provided at an end of the composite-function mold (2) connected to the feeding tank (1); and the first air hole (9) and the second air hole (11) are provided sequentially from top to bottom at another end of the composite-function mold (2), and the first air hole (9) is configured for connecting to a vacuum pump (25).

4. The device for preparing thermosetting bonded magnet as claimed in claim 1, wherein film heating plates (12) are disposed between notched internal walls of the housing (3) and the magnetic iron cores (6), temperature controllers (13) and rechargeable batteries (14) are embedded in the housing (3); and the film heating plates (12), the temperature controllers (13), and the rechargeable batteries (14) are electrically connected with each other, and a fixing assembly is disposed in the housing (3).

5. The device for preparing thermosetting bonded magnet as claimed in claim 4, wherein the fixing assembly comprises first screws (15), second screws (16), and third screws (17); each of the first screws (15) is configured to pass through the housing (3) and a corresponding one of the film heating plates (12) to fix the housing (3), the corresponding one of the film heating plates (12), and a corresponding one of the magnetic cores (6); each of the second screws (16) is configured to pass through a temperature control switch (23) on a surface of a corresponding one of the temperature controllers (13) to fix the temperature control switch (23) and a corresponding one of the magnetic cores (6); and each of the third screws (17) is configured to pass through a thermometer (24) on the surface of the corresponding one of the temperature controllers (13) to fix the thermometer (24) and the housing (3).

6. The device for preparing thermosetting bonded magnet as claimed in claim 1, wherein the permanent magnet orientation pole head frame mechanism comprises left and right brackets (18), and left and right orientation pole heads (19); and the left orientation pole head and the right orientation pole head repel each other magnetically.

7. The device for preparing thermosetting bonded magnet as claimed in claim 6, wherein a distance adjusting turntable (20) is screwed between opposite ends of the left and right brackets (18), rare earth permanent magnets (21) with different polarities are respectively disposed on a disc surface of the left orientation pole head and a disc surface of the right orientation pole head, one of the left and right orientation pole heads (19) is an active pole head, a side of the active pole head is provided with a motor (22), and the other one of the left and right orientation pole heads is a passive pole head.

* * * * *